Figure 1:
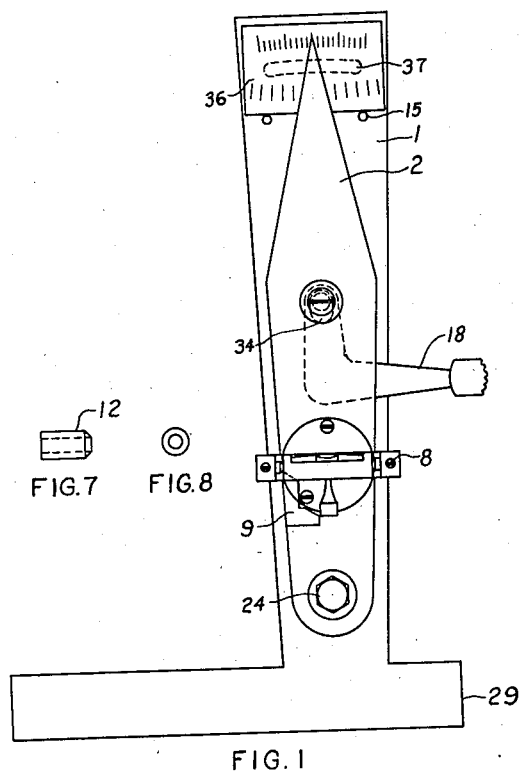

Sept. 8, 1942.　　　C. I. SANDBO　　　2,295,184
ALIGNER GAUGE
Filed June 17, 1940　　　2 Sheets-Sheet 1

INVENTOR.
Clarence I. Sandbo

Sept. 8, 1942.     C. I. SANDBO     2,295,184
ALIGNER GAUGE
Filed June 17, 1940     2 Sheets-Sheet 2
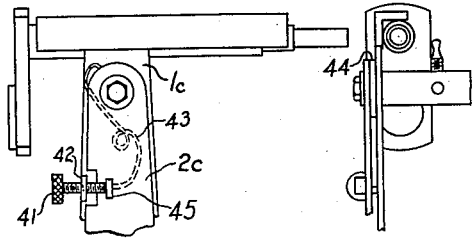
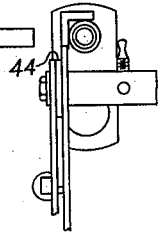
FIG. 11        FIG. 12
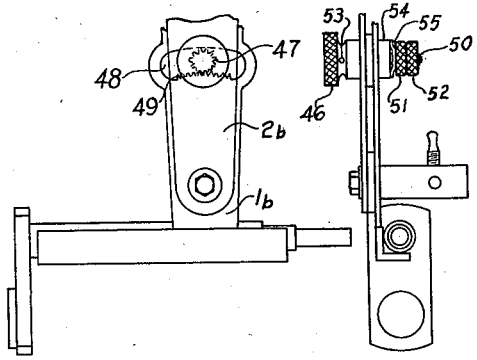
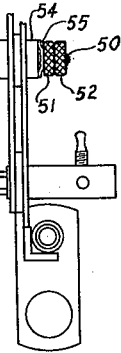
FIG. 13        FIG. 14
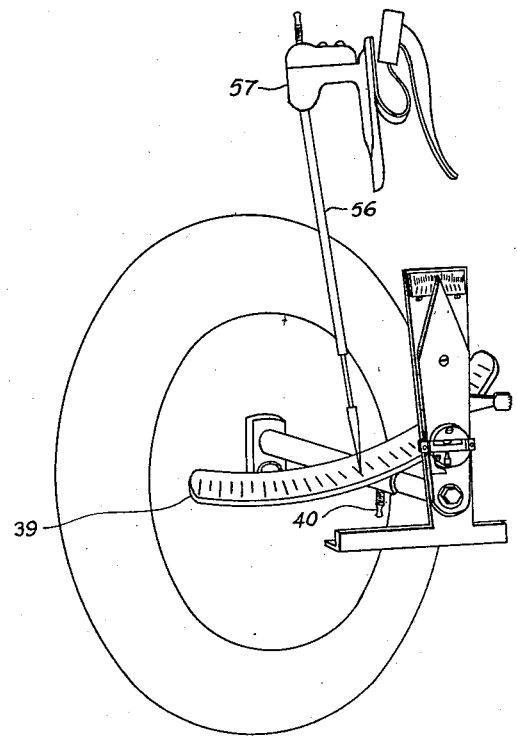
FIG. 15
INVENTOR.
Clarence I. Sandbo Patented Sept. 8, 1942

2,295,184

UNITED STATES PATENT OFFICE 2,295,184

ALIGNER GAUGE

Clarence I. Sandbo, Rock Island, Ill., assignor of one-half to Lee Roy Dehler, Rock Island, Ill., and one-third to W. Leroy Hoehn, Davenport, Iowa Application June 17, 1940, Serial No. 341,056

7 Claims. (Cl. 33—203)

This invention relates to an improvement in gauges, particularly as shown in my patent application, Serial No. 256,311 for measuring vehicle wheel alignment of which this application is a continuation-in-part.

The primary objects of the invention are to provide a simple, compact, exceptionally accurate though inexpensive device for measuring the king pin inclination angle, caster angle, camber angle and steering geometry in vehicle wheel alignment.

The checking of camber, caster and king pin inclination is made without the use of turntables or slip plates and does not require a level floor.

Other objects of the invention are the checking of the relative position of one vehicle spring seat to the other; for checking and measuring axle twist; for checking rear axle of vehicle for presence of camber; for checking king pin inclination angle when axle is removed from vehicle by use of cones and shaft; for checking twist of axle by placing right angle base of gauge on spring seat in either upright or inverted position.

An adjustable, sliding calibrated dial used to compensate for unlevelness of floor when found necessary and adjustable to change from direct reading of camber to indirect reading of caster and king pin inclination.

A gauge having an indicator pointer provided with a spirit level bracket, the base of which is pivotally attached to pointer by use of pin through center of base fastened with conical spring and cotter pin; a spirit level housing supported between two forks of bracket in sleeve bearings; the spirit level housing having a balance weight securely attached to lower sleeve of spirit level housing; means for turning spirit level bracket so that spirit level is either horizontal or perpendicular to the pointer; two abutment pins releasably attached to top surface of the base of spirit level bracket. Spirit level bracket stop is securely attached to pointer with means to stop turn of spirit level bracket so that spirit level is either horizontal or perpendicular to pointer by abutment pins contacting spirit level bracket stop; spirit level is securely inserted in housing having its upper surface cut away to expose upper portion of spirit level; abutment pins have screw driver slots with means for removing abutment pin from spirit level bracket base.

Set screws hold the sleeves of bearings in place in the forks of the bracket. Means with the use of a single spirit level for degree readings of the gauge at right angle, at vertical or inverted position from a given plane.

A rotary level with balance weight attached securely to lower surface of spirit level housing so that opposite angles of camber and king pin angle to caster angle does not affect spirit level reading in checking caster angle as bubble takes line of least resistance resulting in accurate readings which is impossible when instrument with stationary spirit level is moved from a set position to another position in an arc. With means for checking by securely attaching gauge to bracket attached to spindle or by applying right angle gauge against the spindle bracket shaft.

The spirit level housing is balanced so as to keep the spirit level bubble in an upright position at all times.

Figure 2:
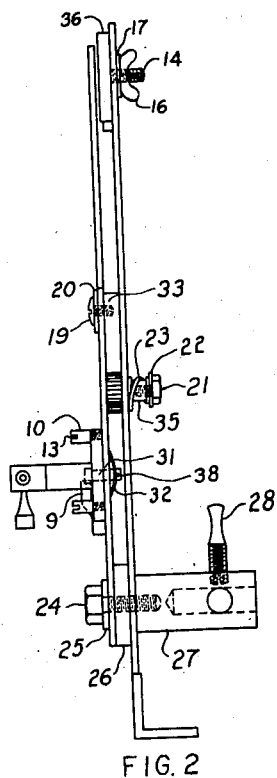

In the drawings accompanying and forming a part of this application I have shown the general features of my invention. Fig. 1 is a front elevation. Fig. 2 is a side elevation of an aligner gauge embodying my improvements. Fig. 3 is a top view of spirit level bracket. Fig. 4 is a front view of spirit level bracket. Fig. 5 is a front view of spirit level showing housing and balance weight. Fig. 6 is a side view of spirit level housing and balance weight. Fig. 7 is a side view of bearing sleeve. Fig. 8 is an end view of bearing sleeve. Fig. 9 is a side view of spindle bracket shaft. Fig. 10 is an end view of base of the spindle bracket shaft. Fig. 11 is a front view and Fig. 12 is a side view of another modification of my invention. Fig. 13 is a front view and Fig. 14 is a side view of still another modification of my invention. Fig. 15 is an isometric view of an aligner gauge embodying my improvements attached in position for measuring king pin inclination angle.

In Figs. 1 to 10 indicator pointer 2 is pivotally attached to gauge body 1 by cap screw 24. Cap screw 24 is provided with shoulder to abut against gauge body 1 securely holding extension support 27 to gauge body 1. Cap screw 24 has bearing shoulder of sufficient length for space required by thickness of indicator pointer 2, washer 25 and spacing washer 26. Spirit level bracket 3 as shown in Fig. 4 is securely attached to indicator pointer 2 by means of upset head pin 31, conical spring 32 and cotter pin 33 through upset head pin 31. Spirit level housing 5 is swingably attached to bracket 3 and held in position by bearing sleeves 12 in bracket 3 by use of set screws 8. The circular bearing shaft 33 is integral with universal lever 18 extending in a lateral position through slot 34 in indicator pointer 2, shaft 33 has internal thread on end with means for connecting lever 18 to indicator pointer 2 by use of cap screw 19 and washer 20. Universal lever 18 is attached to gauge body 1 by a circular bearing shaft 35 in connection with a conical spring 23, washer 22 and cap screw 21. Support pins 15 securely fastened to gauge body 1 act as guiding supports for dial 36. Slot 37 in gauge body 1 is for the purpose of adjusting, turning, and sliding dial 36. Right angle base 29 is securely attached to gauge body 1. Wing nut 16 and washer 17 in connection with threaded pin 14 securely fastened to calibrated dial 36 is used for holding calibrated dial in any given position on gauge body 1. A conical spring 23 is placed between washer 22 and gauge body 1 for the purpose of applying tension on universal lever 18 and as a means for holding indicator pointer 2 in any desired position. Extension support 27 may be of either round or square material drilled and threaded in one end for the purpose of being attached in a stationary position at right angle to gauge body 1 by use of cap screw 24. The opposite end of the extension support 27 has two holes drilled at right angles to each other in the horizontal plane. The thumb screw 28 is used for the purpose of securely fastening extension support 27 to bracket shaft 30 either in a parallel or right angle position. Calibrated measuring plate 39 is used for the purpose of determining the degree turn of vehicle wheel in connection with aligner gauge structure. Thumb screw 40 is used for the purpose of securely holding calibrated measuring plate 39 on bracket shaft 30. Bracket shaft 30 is releasably attached to vehicle wheel spindle.

In Figs. 11 and 12 another type of device is shown comprising my invention. Adjusting knurled screw 41 is attached to gauge body 1c by bracket 42. In turning adjusting knurled screw 41 to the right or left indicator pointer 2c is moved in swinging position on gauge body 1c. The elongated coil spring 43 is attached to spacer washer 44. The opposite end of the elongated coil spring is attached to spacing block 45. Spacing block 45 is securely attached to indicator pointer 2c. Elongated coil spring 43 holds indicator pointer 2c against end of threaded shaft of adjusting knurled screw 41.

In Figs. 13 and 14 a somewhat similar aligner gauge is shown with rack and pinion device to move indicator pointer 2b on gauge body 1b in a swinging motion by turning knurled adjustment button 46 which operates gear 47. Gear 47 travels in clearance slot 48 and meshes with rack teeth 49 which is a part of gauge body 1b. When knurled adjustment button 46 is turned to right from center, indicator pointer 2b will move to right on gauge body 1b. When knurled adjustment button 46 is turned to left, indicator pointer 2b will move to left from center on gauge body 1b. Gear 47 is integral with shaft 50, shaft 50 having bearing surface on both sides of gear 47. One end of shaft 50 is threaded for attaching lock-nuts 51 and 52 and the opposite end is provided with hole for pin 53 to attach knurled adjustment button 46 to shaft 50. Bearing boss 54 is placed between gauge body 1b and flat spring washer 55. Gear 47 is held in mesh with rack teeth 49 with adjustable tension by flat spring washer 55 in connection with lock-nuts 51 and 52.

Spindle bracket shaft 30 as shown in Fig. 9 has two offsets for the purpose of attaching calibrated measuring plate 39 and aligner gauge body 1 in assembly as shown in Fig. 15. Telescopic pointer 56 shown in Fig. 15 is releasably attached to fender of vehicle by spring clamp 57.

Having now described my invention, I claim:

1. An aligner gauge comprising in combination: a gauge body having a right angle base securely attached to gauge body at right angle to center of gauge body; an indicator pointer provided with a spirit level bracket consisting of a circular base and two forks in a position at right angle to base of the bracket; the base of the bracket attached to the face of the pointer by a pivotal axis at right angle to the face of the pointer; spirit level housing swingably attached between two forks of bracket and having an extension shaft at each end forming spirit level housing axis; outer ends of bracket forks provided with sleeve bearings parallel with base and in direct line with each other and means for securely fastening sleeves; a balance weight securely attached to lower surface of spirit level housing; means for turning spirit level bracket on pointer in position so that spirit level is either parallel or perpendicular to indicator pointer; spirit level bracket stop securely attached to pointer; two abutment pins releasably attached to top surface of the base of spirit level bracket with means for degree reading of gauge at right angle, at vertical or inverted position from a given plane; a rectangular shaped calibrated dial having degree reading scales; indicator pointer pivotally attached to gauge body near base of gauge body swingable over gauge body and calibrated dial; an adjustable, sliding calibrated dial releasably attached to upper extremity of gauge body; an extension support releasably attached to back side of gauge body; means for securely attaching extension support of gauge body to spindle bracket with gauge body in position parallel to or perpendicular to plane of wheel; a universal lever operating on a fulcrum attached to gauge body and connected with pointer.

2. An aligner gauge comprising in combination: a gauge body having a right angle base securely attached to gauge body at right angle to center of gauge body; an indicator pointer provided with a spirit level bracket consisting of a circular base and two forks in a position at right angle to base of the bracket; the base of the bracket attached to the face of the pointer by a pivotal axis at right angle to the face of the pointer; spirit level housing swingably attached between two forks of bracket and having an extension shaft at each end forming spirit level housing axis; outer ends of bracket forks provided with sleeve bearings parallel with base and in direct line with each other and means for securely fastening sleeves; a balance weight securely attached to lower surface of spirit level housing; means for turning spirit level bracket on pointer in position so that spirit level is either parallel or perpendicular to indicator pointer; spirit level bracket stop securely attached to pointer; two abutment pins releasably attached to top surface of the base of spirit level bracket with means for degree reading of gauge at right angle, at vertical or inverted position from a given plane; a rectangular shaped calibrated dial having degree reading scales indicator pointer pivotally attached to gauge body near base of gauge body swingable over gauge body and calibrated dial; an adjustable, sliding calibrated dial releasably attached to upper extremity of gauge body; an extension support releasably attached to back side of gauge body; means for securely attaching extension support of gauge body to spindle bracket with gauge body in position parallel to or perpendicular to plane of wheel; a rack and pinion adjusting device attached to gauge body and connected with indicator pointer.

3. An aligner gauge comprising in combination: a gauge body having a right angle base securely attached to gauge body at right angle to center of gauge body; an indicator pointer provided with a spirit level bracket consisting of a circular base and two forks in a position at right angle to base of the bracket; the base of the bracket attached to the face of the pointer by a pivotal axis at right angle to the face of the pointer; spirit level housing swingably attached between two forks of bracket and having an extension shaft at each end forming spirit level housing axis; outer ends of bracket forks provided with sleeve bearings parallel with base and in direct line with each other and means for securely fastening sleeves; a balance weight securely attached to lower surface of spirit level housing; means for turning spirit level bracket on pointer in position so that spirit level is either parallel or perpendicular to indicator pointer; spirit level bracket stop securely attached to pointer; two abutment pins releasably attached to top surface of the base of spirit level bracket with means for degree reading of gauge at right angle, at vertical or inverted position from a given plane; a rectangular shaped calibrated dial having degree reading scales; indicator pointer pivotally attached to gauge body near base of gauge body swingable over gauge body and calibrated dial; an adjustable, sliding calibrated dial releasably attached to upper extremity of gauge body; an extension support releasably attached to back side of gauge body; means for securely attaching extension support of gauge body to spindle bracket with gauge body in position parallel to or perpendicular to plane of wheel; a coil spring and an adjusting set screw device attached to gauge body and connected with indicator pointer.

4. An aligner gauge comprising in combination: a gauge body having a right angle base securely attached to gauge body at right angle to center of gauge body; an indicator pointer provided with a spirit level bracket consisting of a circular base and two forks in a position at right angle to base of the bracket; the base of bracket attached to the face of the pointer by a pivotal axis at right angle to the face of the pointer; spirit level housing swingably attached between two forks of bracket and having an extension shaft at each end forming spirit level housing axis; outer ends of bracket forks provided with sleeve bearings parallel with base and in direct line with each other and means for securely fastening sleeves; a balance weight securely attached to lower surface of spirit level housing; means for turning spirit level bracket on pointer in position so that spirit level is either parallel or perpendicular to indicator pointer; spirit level bracket stop securely attached to pointer; two abutment pins releasably attached to top surface of the base of spirit level bracket; an adjustable, sliding calibrated dial releasably attached to upper extremity of gauge body.

5. An aligner gauge comprising in combination: a gauge body having a right angle base securely attached to gauge body at right angle to center of gauge body; an indicator pointer provided with a spirit level bracket consisting of a circular base and two forks in a position at right angle to base of the bracket; the base of bracket attached to the face of the pointer by a pivotal axis at right angle to the face of the pointer; spirit level housing swingably attached between two forks of bracket and having an extension shaft at each end forming spirit level housing axis; outer ends of bracket forks provided with sleeve bearings parallel with base and in direct line with each other and means for securely fastening sleeves; a balance weight securely attached to lower surface of spirit level housing; an adjustable, sliding calibrated dial releasably attached to upper extremity of gauge body; a bracket with means for attaching aligner gauge to wheel spindle.

6. An aligner gauge comprising in combination: a gauge body having a right angle base securely attached to gauge body at right angle to center of gauge body; an indicator pointer provided with a spirit level bracket consisting of a circular base and two forks in a position at right angle to base of the bracket; the base of bracket attached to the face of the pointer by a pivotal axis at right angle to the face of the pointer; spirit level housing swingably attached between two forks of bracket and having an extension shaft at each end forming spirit level housing axis; outer ends of bracket forks provided with sleeve bearings parallel with base and in direct line with each other and means for securely fastening sleeves; a balance weight securely attached to lower surface of spirit level housing; an adjustable, sliding calibrated dial releasably attached to upper extremity of gauge body; adjustable, sliding calibrated dial has one calibration scale for degree reading of axle caster, and king pin inclination angle, another calibrated scale for direct degree reading.

7. An aligner gauge comprising in combination: a gauge body having a right angle base securely attached to gauge body at right angle to center of gauge body; an indicator pointer provided with a spirit level bracket consisting of a circular base and two forks in a position at right angle to base of the bracket; the base of bracket attached to the face of the pointer by a pivotal axis at right angle to the face of the pointer; spirit level housing swingably attached between two forks of bracket and having an extension shaft at each end forming spirit level housing axis; outer ends of bracket forks provided with sleeve bearings parallel with base and in direct line with each other and means for securely fastening sleeves; a balance weight securely attached to lower surface of spirit level housing; an adjustable, sliding calibrated dial releasably attached to upper extremity of gauge body; means for sliding dial to compensate for starting point other than center of gauge body caused by varied elevation upon which alignment readings are to be determined.

CLARENCE I. SANDBO.

CERTIFICATE OF CORRECTION.

Patent No. 2,295,184.  September 8, 1942.

CLARENCE I. SANDBO.

It is hereby certified that error appears in the above numbered patent requiring correction as follows: In the grant, line 2, and in the heading to the printed specification, lines 3 and 4, for "assignor of one-half" read --assignor of one-third--, as shown by the record of assignments in this office; and that the said Letters Patent should be read with this correction therein that the same may conform to the record of the case in the Patent Office.

Signed and sealed this 27th day of October, A. D. 1942.

(Seal)

Henry Van Arsdale,
Acting Commissioner of Patents.